April 15, 1941.   A. R. RUSSELL   2,238,708
BASE SUPPORTING AN UPRIGHT MEMBER
Filed April 26, 1940   2 Sheets-Sheet 1
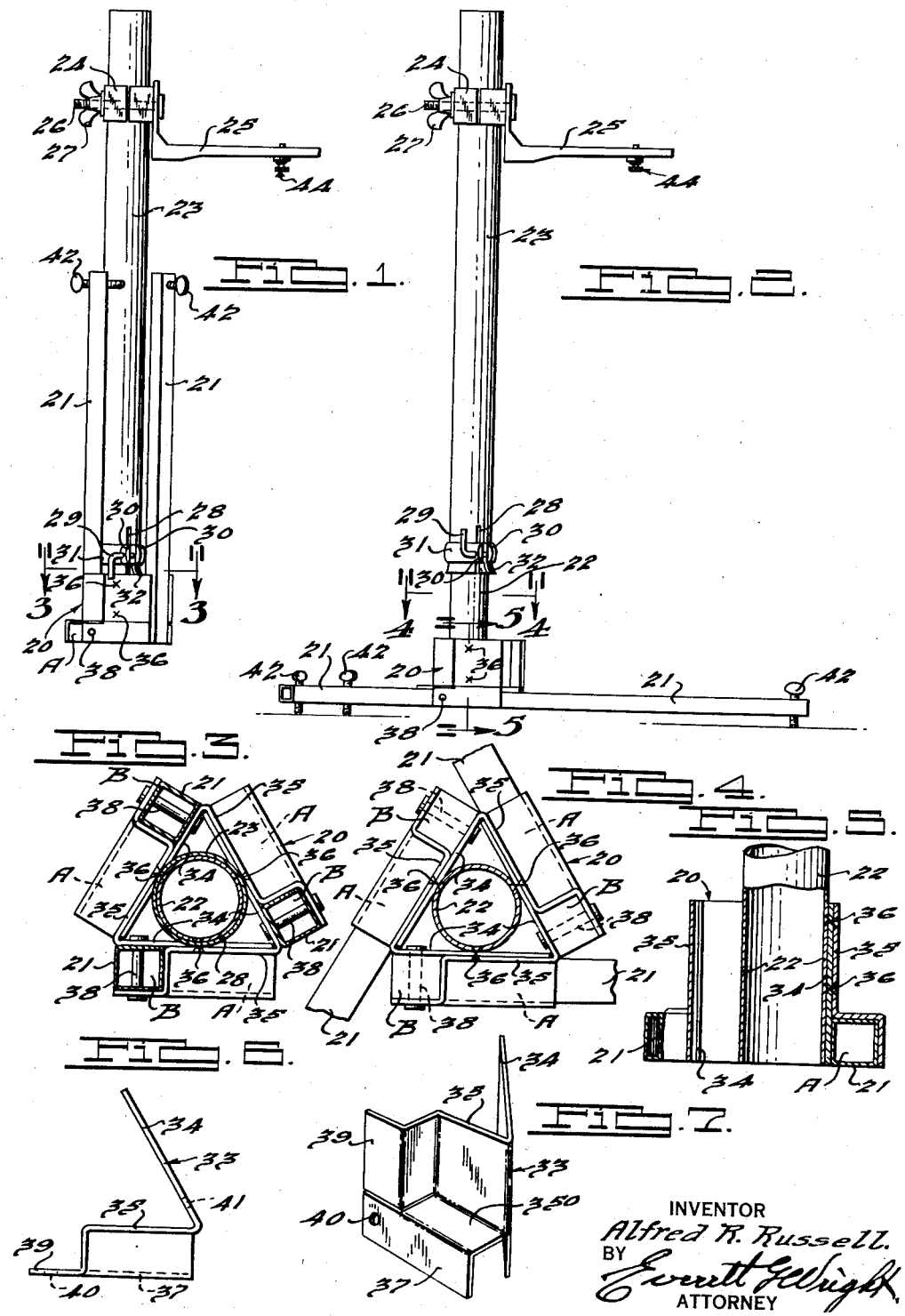
INVENTOR
Alfred R. Russell.
BY
Everett G. Wright
ATTORNEY

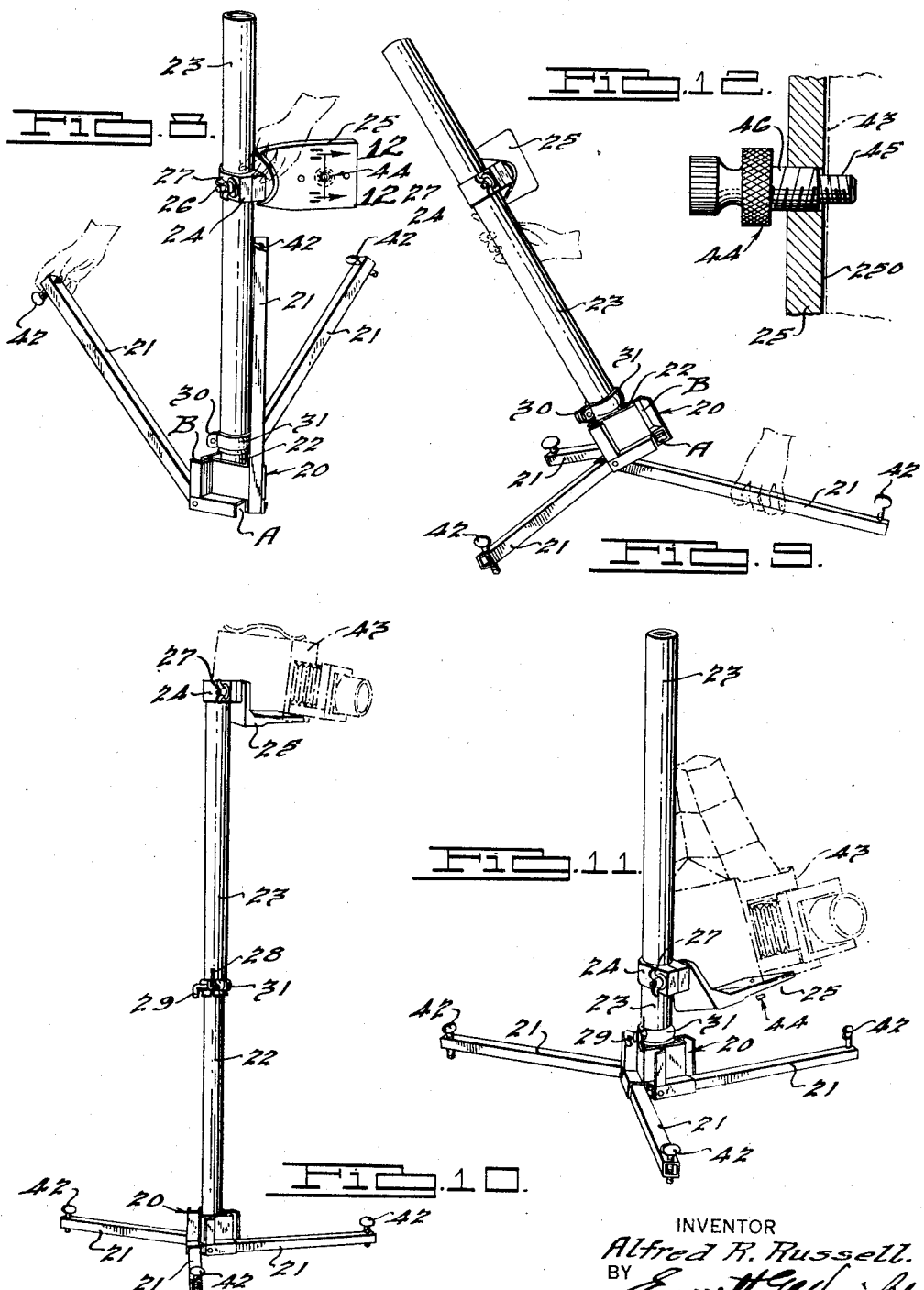

Patented Apr. 15, 1941

2,238,708

UNITED STATES PATENT OFFICE 2,238,708

BASE SUPPORTING AN UPRIGHT MEMBER

Alfred R. Russell, Grosse Pointe, Mich.

Application April 26, 1940, Serial No. 331,725

3 Claims. (Cl. 248—194)

This invention relates to portable stands of the type particularly adaptable for use as a camera stand when taking photographic "shots" from various angles.

The use of tripods in photographic or other work wherein walking around a camera or other instrument supported thereon is necessary, the legs of the tripod are often carelessly kicked or walked into and the tripod and the camera or other instrument thereon is easily upset causing great damage to the said camera or the like.

In modern photographic work among advanced amateurs and in professional studios, the making of "shots" from various angles and elevations necessitates the employment of equipment for supporting cameras which may be adjusted readily to any reasonable desired angle or elevation.

With the foregoing in view, the primary object of the instant invention is to provide a sturdy, portable, economical-to-manufacture camera stand which is easy to manipulate and adjust and which will support a camera or the like thereon at any reasonable angle and position with respect to a subject to be photographed.

Another object of the invention is to provide a portable camera stand to take the place of a tripod which is more easily and readily manipulated than a tripod and which is practically impossible to upset accidentally during normal use.

Other objects of the invention will become apparent by reference to the following detailed description taken in connection with the accompanying drawings, in which:

Fig. 1 is a side elevational view of a camera stand embodying the invention in its folded-up or transport position.

Fig. 2 is a side elevational view of the camera stand disclosed in Fig. 1 extended to its usable position.

Fig. 3 is an enlarged detailed horizontal sectional view taken on the line 3—3 of Fig. 1 showing the base of the camera stand when folded-up into its transport position.

Fig. 4 is an enlarged fragmentary detailed horizontal sectional view taken on the line 4—4 of Fig. 2 showing the base of the camera stand when extended for use.

Fig. 5 is an enlarged fragmentary detailed vertical sectional view taken on the line 5—5 of Fig. 2.

Fig. 6 is an enlarged detailed top plan view of one of three typical interlapping base members employed in the preferred construction of the camera stand embodying the invention herein disclosed.

Fig. 7 is a view in perspective of the interlapping base member shown in Fig. 6.

Fig. 8 is a view in perspective showing the first operation of extending the base of the camera stand disclosed in Figs. 1 to 7 inclusive from its folded-up position shown in Fig. 1 to its extended usable position shown in Figs. 2, 10 and 11.

Fig. 9 is a view in perspective showing the final operation of extending the base of the camera stand from its folded-up position shown in Fig. 1 to its extended usable position shown in Figs. 2, 10 and 11.

Fig. 10 is a view in perspective showing the illustrative embodiment of the invention disclosed herein extended to its uppermost usable position.

Fig. 11 is a view in perspective showing the illustrative embodiment of the invention disclosed herein extended approximately to its lowermost usable position.

Fig. 12 is a fragmentary sectional view taken on the line 12—12 of Fig. 8 showing a preferred means employed for securing a camera to the camera supporting table of the camera stand.

Referring now to the drawings wherein like numerals and letters refer to like and corresponding parts throughout the several views, the preferred illustrative embodiment of the invention disclosed comprises a base generally designated by the numeral 20 having three normally vertically disposed horizontally extensible legs 21 pivotally secured thereto, a tubular upright member 22 secured to the said base 20, a tubular upright extension member 23 telescoped over the said upright member 22, a split collar 24 telescopingly mounted over the said upright extension member 23 and a camera supporting table 25 swivelly secured to the said split collar 24 on a horizontally disposed clamping bolt 26 tightened by a wing nut 27 which both secures the spit collar 24 in the desired vertical position on the upright extension member 23 and secures the camera supporting table 25 in the desired tilted position in a plane normal to the upright member 22 and the upright extension member 23 telescoped thereover.

The lower portion of the upright extension member 23 is preferably split at 28 to allow tightening against the upright member 22 by the turning of a shouldered key 29 telescoped through one and threaded through the other of the extending ends 30 of the clamp 31 disposed around the said split portion 28 of the upright extension member 23. A flare 32 provided at the lower end of the upright extension member 23 prevents the clamp 31 from sliding off therefrom when loosened by turning the key 29.

The base 20 is formed of three identical interlapping base members 33 having vertically disposed sides 34 and 35 bent on an angle of sixty degrees with respect to each other and so dimensioned as to form, when interlapped, an equilateral triangle in contact at three points with the tubular upright member 22 as best shown in Figs. 3 and 4. The said interlapping base members 33 are secured in their interlapped position with respect to each other and to the tubular upright member 22 by a plurality of spot welds 36 as indicated in Figs. 1 to 5 inclusive.

The lower portion of the vertically disposed side 35 of each base member 33 of the base 20 is bent horizontally outward and then vertically downward to provide a horizontally disposed offset flange 37 which cooperates with the vertically disposed side 34 of an adjacent base member 33 to form a horizontally extending downwardly disposed channel A into which a leg 21 of the camera stand base 20 is pivoted on a rivet or like pivot 38 extending between and through the said offset flange 37 and the vertically disposed side 34 of the said adjacent base member 33. Each of the said legs 21 is positioned in a horizontally extending downwardly disposed channel A when pivoted to its horizontal extended position shown in Figs. 2 and 4.

The end portion of the vertically disposed side 35 of each base member 33 of the base 20 is bent vertically outward and laterally endward to provide a vertically disposed offset flange 39 which cooperates with the vertically disposed side 34 of an adjacent base member 33 to form a vertically extending laterally disposed channel B into which the leg 21 of the camera stand base 20 is pivoted on the said rivet or like pivot 38. Each of the said legs 21 is positioned in a vertically extending laterally disposed channel B when pivoted to its vertical folded-up or transport position shown in Figs. 1 and 3.

By reference to Figs. 6 and 7, it will be noted that each base member 33 has its horizontally disposed outward portion 350 of the vertically disposed side 35 thereof blocked out to leave the channel B clear for occupancy by a leg 21 when pivoted to its upright position. Also, the horizontal offset flange 37 of the vertically disposed side 35 and the vertically disposed side 34 of each base member 33 are each provided with an aperture 40 and 41 respectively which, when the base members 33 are assembled in interlapped position as shown in detail in Figs. 3, 4 and 5, are located in opposite pairs to receive the rivets or the like 38 upon which the legs 21 are pivoted. Each leg member 21 of the base 20 is preferably formed of a hollow square tube and has a wing screw 42 threaded therethrough near the end thereof, and together serve as adjustable feet for the said base 20. The width between flanges of the channels A and B is such that the flanges thereof frictionally engage the legs 21 and hold them in their horizontal extended or vertical folded-up position to which the said legs 21 may be adjusted. As an alternate, suitable detent means may be employed to hold the legs 21 in either their horizontal extended or vertical folded-up position.

When a camera stand embodying the invention is to be placed in use, the legs 21 of the base 20 thereof are each pivoted from their vertical or folded-up transport position shown in Figs. 1 and 3 in an arc of 270 degrees to their horizontal extended in-use position shown in Figs. 2 and 4, as demonstrated in Figs. 8 and 9. That is, each leg 21 is pivoted about its pivot 38 from its position within its channel B to its position within its channel A, each leg being frictionally held in either position by contact with the material forming the sides of the said channels A and B. Figs. 10 and 11 show the embodiment of a camera stand disclosed in use with a camera 43 secured to the camera supporting table 25 thereof.

Fig. 12 shows a preferred means for securing a camera to the camera supporting table 25 of the camera stand which comprises a shouldered knurled set screw 44 having a right hand thread on the end portion 45 thereof extending above the top 250 of the table 25 and a left hand thread on the shank portion 46 thereof extending part of the way through the said supporting table 25. A camera 43 indicated by dot and dash lines in Fig. 12 is secured onto the upper right hand threaded portion 45 of the set screw 44 to substantially against the top 250 of the camera supporting table 25, and then the said camera 43 is secured to the table 25 at any desired angle thereon by turning the head of the set screw 44 in a clockwise direction when viewing the said set screw from the bottom of the said supporting table 25.

Although but one embodiment of the invention has been disclosed and described in detail, it is obvious that many changes may be made in the size, shape, arrangement and detail of the various parts thereof without departing from the spirit of the invention as defined by the appended claims.

I claim:

1. A base for supporting an upright member comprising a plurality of pairs of channel members circumferentially spaced around said upright member and secured thereto, each pair of channels being composed of one horizontally extending downwardly disposed channel and one vertically extending horizontally disposed channel intersecting with each other, a horizontally disposed pivot located at the intersection of each pair of said channel members, and a leg member mounted on each pivot swingable in an arc into either a horizontal extended position or vertical folded-up position in registry within said horizontally and vertically extending channels.

2. A base for supporting an upright member composed of three interlapping angular base members secured together and to said upright member forming a triangle, each angular base member being formed to provide in cooperation with a juxtaposed angular base member a horizontally extending downwardly disposed channel member and a vertically extending horizontally disposed channel member intersecting with each other, a horizontal pivot disposed between spaced portions of juxtaposed angular base members at the intersection of said channel members, and a leg member mounted on each pivot swingable in an arc into either a horizontal extended position or vertical folded-up position in registry within said horizontally and vertically extending channels.

3. A base for supporting a tubular upright member comprising a plurality of pairs of horizontally extending downwardly disposed channels and vertically extending horizontally disposed channels intersecting with each other circumferentially spaced around and secured to said upright member, a horizontally disposed pivot located at the intersection of each pair of said channel members, and a leg member mounted on each pivot swingable in an arc into either a horizontal extended position or vertical folded-up position in registry within said horizontally and vertically extending channels.

ALFRED R. RUSSELL.